(12) United States Patent
Livingston-Peters et al.

(10) Patent No.: US 9,701,092 B2
(45) Date of Patent: Jul. 11, 2017

(54) METHOD FOR REMOVING MATRIX FROM A COMPOSITE MATERIAL USING A LASER

(71) Applicants: Ann Livingston-Peters, Seattle, WA (US); Gabriel Mountjoy, Seattle, WA (US)

(72) Inventors: Ann Livingston-Peters, Seattle, WA (US); Gabriel Mountjoy, Seattle, WA (US)

(*) Notice: Subject to any disclaimer, the term of this patent is extended or adjusted under 35 U.S.C. 154(b) by 0 days.

(21) Appl. No.: 14/788,586

(22) Filed: Jun. 30, 2015

(65) Prior Publication Data

US 2015/0328858 A1 Nov. 19, 2015

Related U.S. Application Data

(62) Division of application No. 13/832,516, filed on Mar. 15, 2013, now Pat. No. 9,205,629.

(51) Int. Cl.
*B23K 26/38* (2014.01)
*B32B 3/02* (2006.01)
(Continued)

(52) U.S. Cl.
CPC .............. *B32B 3/02* (2013.01); *B29C 53/06* (2013.01); *B29C 59/007* (2013.01); *B29C 59/16* (2013.01); *B32B 3/14* (2013.01); *B32B 3/18* (2013.01); *B32B 5/145* (2013.01); *B32B 5/22* (2013.01); *B32B 7/08* (2013.01); *B32B 27/08* (2013.01);
(Continued)

(58) Field of Classification Search
CPC ...... B23K 26/36; B23K 26/364; B23K 26/38; B23K 2203/16; B29C 53/06; B29C 59/007; B29C 59/16
See application file for complete search history.

(56) References Cited

U.S. PATENT DOCUMENTS 4,908,494 A * 3/1990 Faiz ................... B23K 26/40
219/121.66
5,350,614 A 9/1994 Chase
(Continued)

FOREIGN PATENT DOCUMENTS

CN 102120521 7/2011
JP 08-242514 A * 9/1996
(Continued)

OTHER PUBLICATIONS

Machine translation of Japan Patent document No. 2011-079,289, Aug. 2011.*
(Continued)

*Primary Examiner* — Geoffrey S Evans
(74) *Attorney, Agent, or Firm* — Fitch, Even, Tabin & Flannery LLP

(57) ABSTRACT

A method for removing matrix from a composite material comprising reinforcement embedded in a matrix and having a thickness bounded by the first surface and a second surface of the composite material. A laser is oriented with a beam axis of the laser approximately perpendicular to the first surface of the composite material. The laser travels over a region of the first surface of the composite material, wherein the laser removes a portion of or the entire thickness of the composite matrix at the region while leaving the reinforcement of the composite material intact.

12 Claims, 6 Drawing Sheets

(51) Int. Cl.

| | | |
|---|---|---|
| *B32B 5/14* | (2006.01) | |
| *B32B 5/22* | (2006.01) | |
| *B32B 7/08* | (2006.01) | |
| *B29C 59/16* | (2006.01) | |
| *B29C 53/06* | (2006.01) | |
| *B29C 59/00* | (2006.01) | |
| *B32B 27/08* | (2006.01) | |
| *B32B 27/20* | (2006.01) | |
| *B32B 27/36* | (2006.01) | |
| *B32B 27/38* | (2006.01) | |
| *B32B 3/14* | (2006.01) | |
| *B32B 3/18* | (2006.01) | |
| *B29L 9/00* | (2006.01) | |
| *B29L 7/00* | (2006.01) | |
| *B23K 103/16* | (2006.01) | |

(52) U.S. Cl.
CPC ............ *B32B 27/20* (2013.01); *B32B 27/36* (2013.01); *B32B 27/38* (2013.01); *B23K 26/38* (2013.01); *B23K 2203/16* (2013.01); *B29C 2791/009* (2013.01); *B29L 2007/001* (2013.01); *B29L 2009/00* (2013.01); *B32B 2250/02* (2013.01); *B32B 2250/20* (2013.01); *B32B 2553/00* (2013.01); *B32B 2571/00* (2013.01); *B32B 2571/02* (2013.01); *Y10T 428/192* (2015.01)

(56) References Cited

U.S. PATENT DOCUMENTS

| | | | |
|---|---|---|---|
| 5,463,794 | A | 11/1995 | Erland |
| 5,707,474 | A | 1/1998 | Andersen |
| 5,817,271 | A * | 10/1998 | Congleton ........ A61F 13/15707 |
| | | | 219/121.68 |
| 5,945,053 | A | 8/1999 | Hettinga |
| 6,245,275 | B1 | 6/2001 | Holsinger |
| 6,511,727 | B1 | 1/2003 | Bleibler |
| 7,354,033 | B1 | 4/2008 | Murphey |
| 7,582,345 | B2 | 9/2009 | Priegelmeir |
| 2005/0189674 | A1 | 9/2005 | Hochet |
| 2007/0000091 | A1* | 1/2007 | Priegelmeir ............. B32B 1/04 |
| | | | 16/372 |
| 2011/0036029 | A1 | 2/2011 | Tourneur |
| 2011/0177279 | A1 | 7/2011 | Casteras |
| 2012/0176736 | A1 | 7/2012 | Apgar |
| 2013/0001206 | A1* | 1/2013 | Yamamoto ............ B23K 26/14 |
| | | | 219/121.72 |
| 2013/0216740 | A1* | 8/2013 | Russell-Clarke ...... B23K 26/38 |
| | | | 219/121.72 |
| 2015/0367538 | A1* | 12/2015 | Mochizuki ............. B29C 65/08 |
| | | | 264/400 |

FOREIGN PATENT DOCUMENTS

| | | | |
|---|---|---|---|
| JP | 2004332399 | | 11/2004 |
| JP | 2007332769 | | 12/2007 |
| JP | 2011079289 A | * | 4/2011 |
| JP | 2013043292 | | 3/2013 |
| WO | WO-2010/119995 A1 | * | 4/2010 |
| WO | WO-2011/114592 A1 | * | 9/2011 |
| WO | 2012035465 | | 3/2012 |

OTHER PUBLICATIONS

International Search Report and Written Opinion for PCT/US2014/025048 mailed from the International Searching Authority on Aug. 4, 2014.
Restriction Requirement in U.S. Appl. No. 13/832,516 mailed Nov. 20, 2014.
Non-final office action in U.S. Appl. No. 13/832,516 mailed Jan. 29, 2015.
Final office action in U.S. Appl. No. 13/832,516 mailed Apr. 14, 2015.
Advisory Action in U.S. Appl. No. 13/832,516 mailed Jun. 22, 2015.
Notice of Allowance in U.S. Appl. No. 13/832,516 mailed Aug. 5, 2015.

* cited by examiner

METHOD FOR REMOVING MATRIX FROM A COMPOSITE MATERIAL USING A LASER

This application is a divisional of U.S. application Ser. No. 13/832,516, filed Mar. 15, 2013, for COMPOSITE STRUCTURE WITH A FLEXIBLE SECTION FORMING A HINGE, which is incorporated in its entirety herein by reference.

BACKGROUND OF THE INVENTION

1. Field of the Invention

The present invention relates generally to composite materials, and more specifically, to a system and method for integral fiber hinges in composite materials.

2. Discussion of the Related Art

This invention relates to creating an integral hinge in a composite material. Throughout the text, "composite material" means materials made from two or more constituent materials with different physical or chemical properties, that when combined, produce a material with characteristics different from the individual components. The individual components remain separate and distinct within the finished structure. Composite materials are made up of individual materials referred to as constituent materials. There are two main categories of constituent materials: matrix and reinforcement. At least one portion of each type is required. The matrix material surrounds and supports the reinforcement materials by maintaining their relative positions.

Integral non-articulated hinges, for example of the so-called film-hinge type, have been known for a long time, and form the basis of many applications, in particular, in the field of packaging. In general, they consist of a local reduction in thickness of materials resilient in flexure, thus making it possible to form a more flexible portion between two stiffer portions of such materials. The flexibility due to the reduction of thickness is typically permanent.

Integral non-articulated hinges can also be formed by integrating a separate, more flexible material into the composite during its manufacture. This typically requires multiple materials and consideration of the bond between the composite and hinge materials. As with the film hinge, the flexibility of the hinge is a typically a permanent part of the finished material.

Another practice is to use a separate hinge, for example metal, that joins two separate pieces of composite material. The hinge typically must be made separately from the composite parts and often must be joined to the composite parts by drilling, fastening, bonding or other means.

Composite shapes are typically formed in an open or closed forming mold. The use of a mold limits the forming of composite shapes. For example, a closed sphere cannot be molded without including the inner form in the final product.

Accordingly, what is needed is a hinge that overcomes the disadvantages of the aforementioned hinges.

SUMMARY OF THE INVENTION

Several embodiments of the invention advantageously address the needs above as well as other needs by providing system and method for integral fiber hinges in composite materials.

In one embodiment, a composite structure includes a first composite section including a fiber reinforcement and a composite matrix, a second composite section including the fiber reinforcement and the composite matrix, and a flexible section interposed between the first composite section and the second composite section. The flexible section includes the fiber reinforcement and a reduced portion of the composite matrix. The composite structure is bendable at the flexible section to permit repeated rotation of the first composite section relative to the second composite section by more than 90 degrees.

In an embodiment, the flexible section has a maximum width of no more than 10 millimeters.

In an embodiment, the flexible section extends across at least a portion of a length of the composite structure.

In an embodiment, the flexible section extends across an entire length of the composite structure.

In an embodiment, the flexible section permits repeated rotation of the first composite section relative to the second composite section by up to 180 degrees.

In one embodiment, a method of forming the flexible section in the above composite structure includes removing at least a portion of the composite matrix of the composite structure between opposed first and second edges bounding the flexible section. The removing may include removing at least a portion of the composite matrix of the composite structure between opposed first and second edges bounding the flexible section using a laser.

In an embodiment, the method includes placing a first blocking bar adjacent a first one of the edges of the flexible section to cover a portion of the first composite section and a second blocking bar adjacent a second one of the edges of the flexible section to cover the second composite section during the removing at least a portion of the composite matrix of the composite structure between opposed first and second edges bounding the flexible section.

In one embodiment, the method includes positioning the fiber reinforcement in a planar configuration; placing a blocking bar to cover an area of the fiber reinforcement between opposite edges corresponding to the flexible section; adding a composite matrix to the fiber reinforcement, the blocking bar restricting at least a portion of the composite matrix from entering the flexible section.

In another embodiment, the method includes: positioning the fiber reinforcement in a planar configuration; placing a chemical blocking agent to cover an area of the fiber reinforcement between opposite edges corresponding to the flexible section; adding a composite matrix to the fiber reinforcement, the chemical blocking agent restricting at least a portion of the composite matrix from entering the flexible section.

In an alternative embodiment, a composite structure includes a first composite section including a fiber reinforcement and a composite matrix, a second composite section including the fiber reinforcement and the composite matrix, and a flexible section interposed between the first composite section and the second composite section. The flexible section includes the fiber reinforcement and no portion of the composite matrix. The composite structure is bendable at the flexible section to permit repeated rotation of the first composite section relative to the second composite section by more than 90 degrees.

A method of forming the flexible section in the composite structure of the alternative embodiment includes removing all of the composite matrix of the composite structure between opposed first and second edges bounding the flexible section. The removing may include removing all of the composite matrix of the composite structure between opposed first and second edges bounding the flexible section using a laser.

In an embodiment, the method includes placing a first blocking bar adjacent a first one of the edges of the flexible section to cover a portion of the first composite section and a second blocking bar adjacent a second one of the edges of the flexible section to cover the second composite section during the removing all of the composite matrix of the composite structure between opposed first and second edges bounding the flexible section.

In one embodiment, the method includes positioning the fiber reinforcement in a planar configuration; placing a blocking bar to cover an area of the fiber reinforcement between opposite edges corresponding to the flexible section; and adding a composite matrix to the fiber reinforcement, the blocking bar preventing the composite matrix from entering the flexible section.

In another embodiment, the method includes positioning the fiber reinforcement in a planar configuration; placing a chemical blocking agent to cover an area of the fiber reinforcement between opposite edges corresponding to the flexible section; and adding a composite matrix to the fiber reinforcement, the chemical blocking agent preventing the composite matrix from entering the flexible section.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
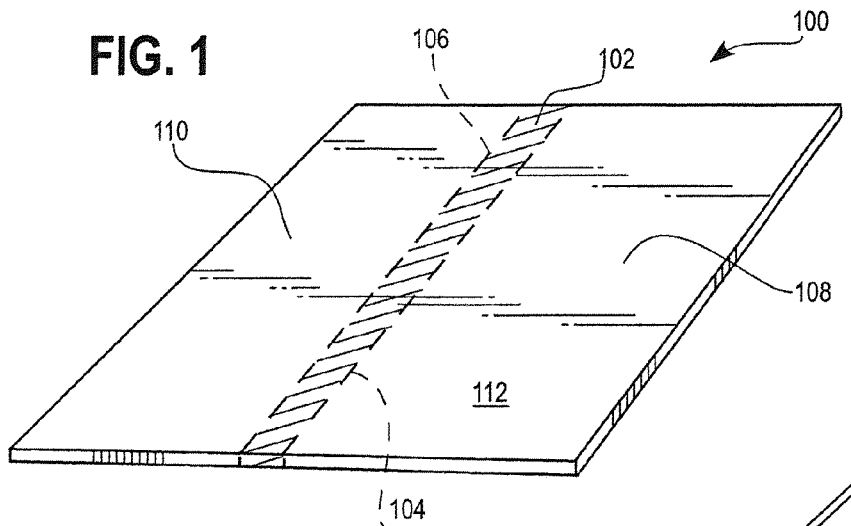
FIG. 1 is a perspective view of a composite material with a hinge according to an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Referring to FIG. 1, one embodiment of a composite structure 100 with a flexible section or hinge 102 is shown. The composite structure 100 comprises a composite material, which as described above, generally comprises matrix and reinforcement, and in one form, includes one or more types of composite fiber reinforcement and one or more types of composite matrix.

In the exemplary form the hinge 102 of the composite structure 100 is a fiber hinge. The expression "fiber" is understood to mean a type of fiber composite reinforcement. Types of composite matrix compatible with fiber hinge formation include, but are not limited to, epoxy resin, polyester resin, and vinyl-ester resin. The fiber hinge 102 has been shown in FIG. 1 as being linear, but may have any other suitable shape, for example, curved, undulating, zigzagging, or the like.

In the embodiment shown in FIG. 1, the composite structure 100 has a sheet-like shape having a large planar area and a relatively small thickness. In one approach, the composite structure 100 may be square-shaped, with each side being about 1 inch to about 48 inches. In another approach, the composite structure 100 may be rectangular, with a length of about 2 inches to about 92 inches and a width of about 1 inch to about 92 inches. It will be appreciated that instead of being square or rectangular, the composite structure 100 may have any other suitable shape, for example, trapezoidal, triangular, or the like.

The hinge 102 of the composite structure 100 includes first and second edges 104, 106, which define the boundaries of the hinge 102. The first edge 104 separates the hinge 102 from the first section 108 of the composite material 100 and the second edge 106 separates the hinge 102 from the second section 110 on the upper surface 112 of the composite material 100. In the form shown in FIG. 1, the hinge 102 is formed when at least a portion of the composite matrix is removed from the composite structure 100. As shown in FIG. 1, the hinge 102 bounded by the edges 104, 106 and the thickness of the first and second sections 108, 110 of the composite material.

In one embodiment, removal of at least a portion of the composite matrix from the composite structure 100 results in a reduced portion of the composite matrix remaining in the area of the hinge 102 of the composite structure 100. A reduced portion of the composite matrix will be understood to mean a remaining portion of the composite matrix after a percentage of the composite matrix has been removed. For example, a reduced portion of the composite matrix may be a portion of the composite matrix including from about 0.01% to about 10% (e.g., about 0.1%, 0.5%, 1%, 2%, 3%, 4%, 5%, 6%, 7%, 8%, 9%, 10%) of the composite matrix relative to the composite matrix present in the composite structure 100 outside of the edges 104, 106 of the hinge 102.

In another embodiment, removal of the composite matrix from the composite structure 100 results in a composite structure 100 where the area of the hinge 102 between the edges 104, 106 includes no (i.e., zero) composite material matrix.

As shown in FIG. 1, one example of the hinge 102 is a narrow strip of material extending across at least a portion of the length of the composite structure 100. The removal of the composite matrix of the composite structure 100 to form the hinge 102 is preferably accomplished in a way such that the fibers forming the fiber hinge remain intact. Methods for removal of portions of the composite matrix to form the hinge 102 according to some embodiments are described below.

The hinge 102 allows for pivoting, bending, and rotational movement of the composite structure 100 about the hinge 102 without breaking the composite structure 100. For example, the composite structure 100 may bend or rotate about the hinge 102 by 180 degrees or less, for example, by more than 90 degrees (e.g, 120 degrees, 150 degrees), by 90 degrees, or by less than 90 degrees (e.g., 60 degrees, 30 degrees). In one embodiment, the width of the hinge 102 is approximately 1/16" to 1/8". In one embodiment, the width of the flexible section or hinge 102 is no more than 10 millimeters.

Figure 1A:
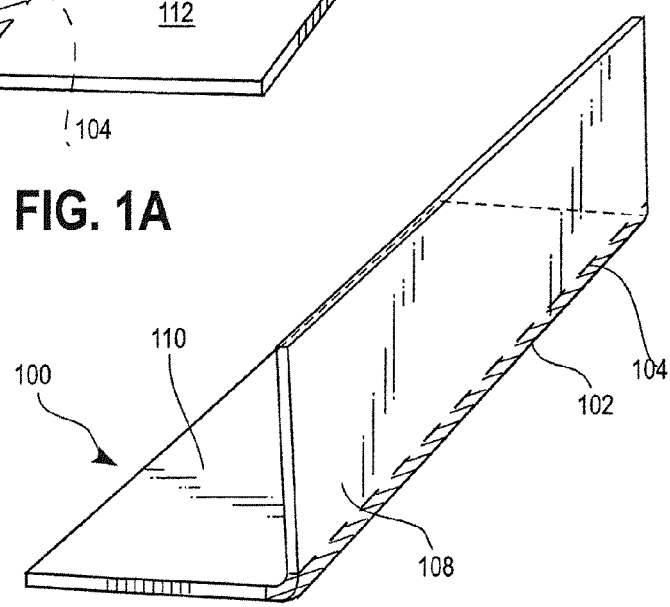
FIG. 1A is a perspective view of the composite material with the hinge in another configuration according to an embodiment of the invention.
Figure 1B:
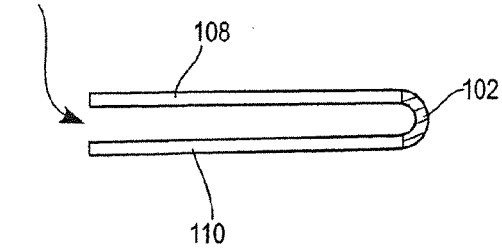
FIG. 1B is an end view of the composite material with the hinge in another configuration according to an embodiment of the invention.
Figure 1C:
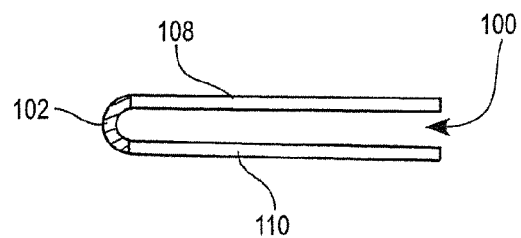
FIG. 1C is an end view of the composite material with the hinge in another configuration according to an embodiment of the invention.

FIG. 1A depicts the composite structure 100 shown in FIG. 1 undergoing a bend of approximately 90° where a corner is formed by the hinge 102. FIG. 1B depicts the composite structure 100 undergoing a bend of approximately 180° where a corner is formed by the hinge 102. The 180° bend shown in FIG. 1B is fully reversible, as shown in FIG. 10, which shows the composite structure 100 undergoing a reverse bend of approximately 180°, thereby illustrating that the hinge 102 can undergo bending over a range of from 0° past 90°, past 180°, and past 270° up to 360°. The radius of curvature at a corner formed by a hinge 102 is generally small, for example, from about 0.0625" to about 0.125".

Figure 2:
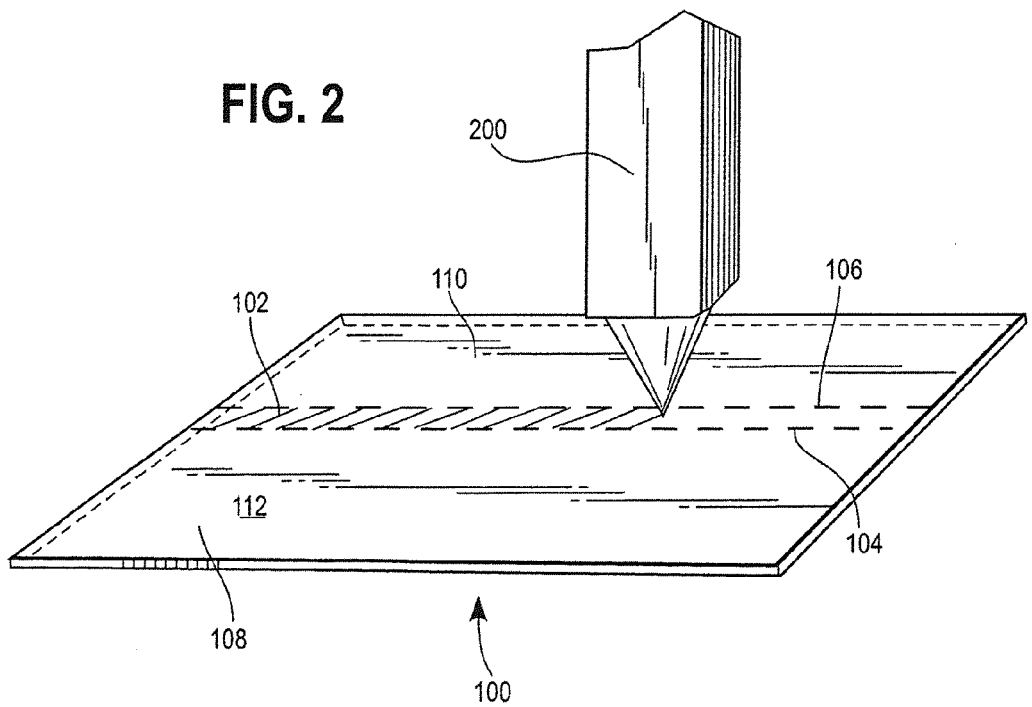
FIG. 2 is a perspective view of the composite material with the hinge formed by a laser according to an embodiment of the present invention.

FIG. 2 depicts one embodiment of a method of removal of material from the composite structure 100 to form the hinge 102. The composite structure 100 in a sheet-like shape and an exemplary device adapted to remove portions of the composite structure 100, such as a laser 200 are shown. The laser 200 is preferably a $CO_2$ type of laser, but it will be appreciated that other lasers may be used.

As shown in FIG. 2, the laser 200 is oriented with its beam axis perpendicular to the upper surface 112 of the composite structure 100. The hinge 102 is shown in FIG. 2 being formed by the laser 200 traveling over the area bounded by the edges 104, 106 to remove a portion or all of the composite matrix between the edges 104, 106 from the composite structure 100. In the example shown in FIG. 2, the composite structure 100 has a width of approximately 4" and the laser 200 removes approximately 1/4" of material from the composite structure 100 to form the hinge 102.

As shown in FIG. 2, the hinge 102 being formed by the laser 200 is in a form of a narrow strip of material extending across the length of the composite structure 100. The laser 200 is preferably of a type and strength sufficient to remove a portion or all of the composite matrix while leaving the fiber reinforcement of the composite structure 100 intact. The hinge width for this method is approximately 1/16"-1/8".

In an alternative embodiment, the hinge 102 may be formed by removing all or a portion of the composite matrix of the composite structure 100 in an area where the hinge 102 is to be formed with an electric contact heat source such as a solder gun, heat knife, heated press, or the like, and then pressing the composite structure 100 onto the heat source to vaporize the composite matrix in a precise predetermined location to form the hinge 102.

Figure 3:
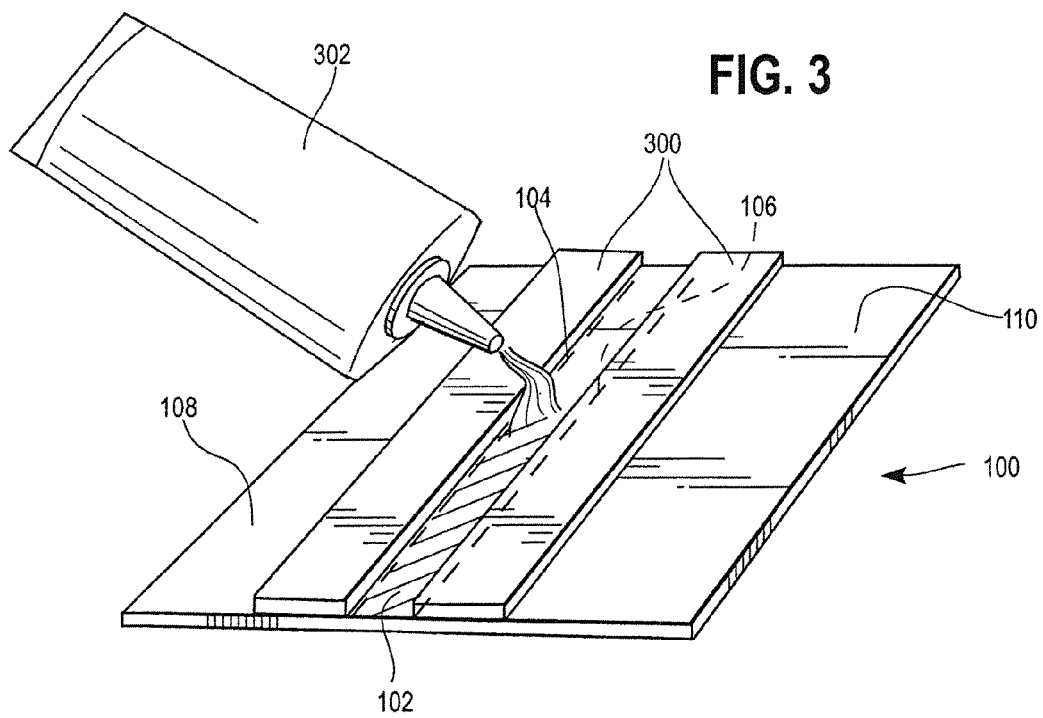
FIG. 3 is a perspective view of the composite material with the hinge formed by a torch and plates according to an embodiment of the present invention.

FIG. 3 depicts another embodiment of a method of formation of the hinge 102 by removal of at least a portion of the composite structure 100. The composite structure 100 is shown in FIG. 3 in a sheet-like shape, including two plates 300 and a torch 302. While two plates 300 are shown in FIG. 3, it will be appreciated that any suitable number of plates may be used, for example, one, two, three, four, or more.

In the embodiment shown in FIG. 3, the plates 300, for example, steel plates, are placed on the composite structure 100 on either side of the hinge 102. In lieu of steel plates, other plates, for example ceramic or aluminum, or the like may be used. The plates 300 function to protect the composite matrix of the first and second composite sections 108, 110 adjacent to the hinge 102 from being removed by the torch 302 during the removal process. As shown in FIG. 3, the hinge 102 is formed by the oxyfuel torch 302 traveling over the area bounded by the edges 104, 106 of the hinge 102 and removing at least a portion of the composite matrix of the composite structure 100.

As shown in FIG. 3, the hinge 102 is in a form of a narrow strip of material extending across the length of the composite structure 100. The torch 302 heats the area bounded by the edges 104, 106 of the hinge 102 until at least a portion of the composite matrix of the composite structure 100 is removed while leaving the fiber reinforcement intact. Instead of the oxyfuel torch 302 other torches, for example propane or mapgas or the like, may be used. The hinge width for this method is approximately 1/8"-1/4".

Figure 4:
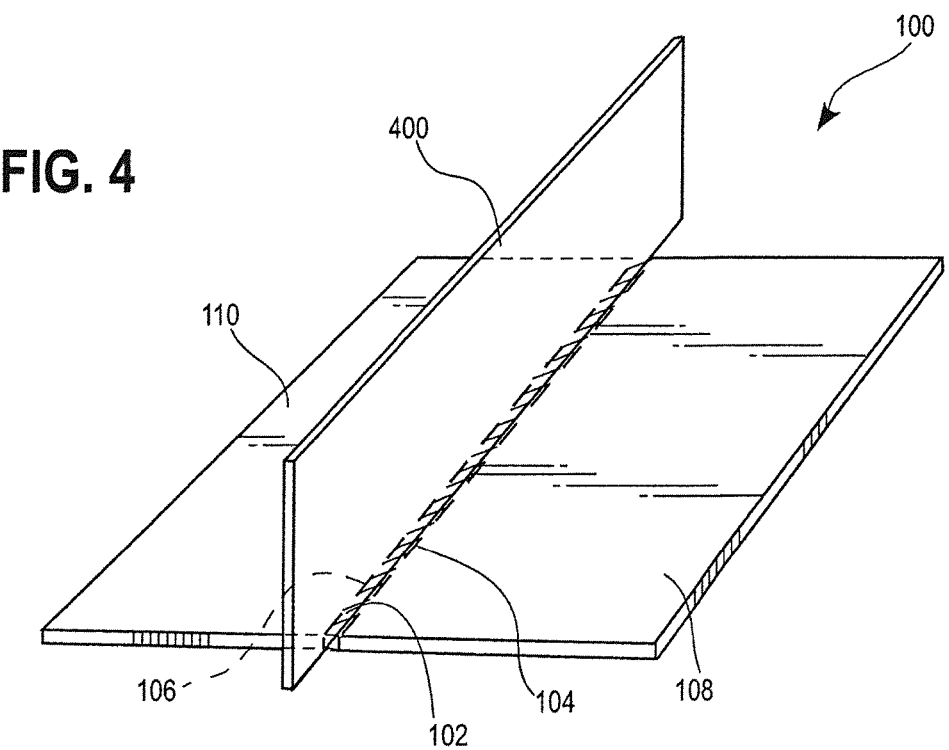
FIG. 4 is a perspective view of the composite material with the hinge formed by a matrix blocking bar according to an embodiment of the present invention.

FIG. 4 depicts another embodiment of a method of removal of portions of the composite structure 100 to form the hinge 102. FIG. 4 shows the composite structure 100 in sheet-like shape, a blocking bar 400 and the hinge 102. The blocking bar 400 is sized and placed in FIG. 4 so that the blocking bar 400 covers the area bounded by the edges 104, 106 and which forms the hinge 102.

As shown in FIG. 4, the blocking bar 400 is placed on the composite structure 100 after placing the fiber reinforcement but prior to the addition of the composite matrix. The hinge 102 is formed by preventing the composite matrix from entering the area encompassed by the edges 104, 106 of the hinge 102. The blocking bar 400 may be made of metal or other suitable materials, for example, plastic or any other solid, nonporous material, or the like. The composite matrix of the composite structure 100 is added onto the fiber reinforcement of the composite structure 100 after placement of the blocking bar 400. The blocking bar 400 may be removed after the composite matrix has set. The hinge width for this method is approximately ⅛"-¼".

Figure 5:
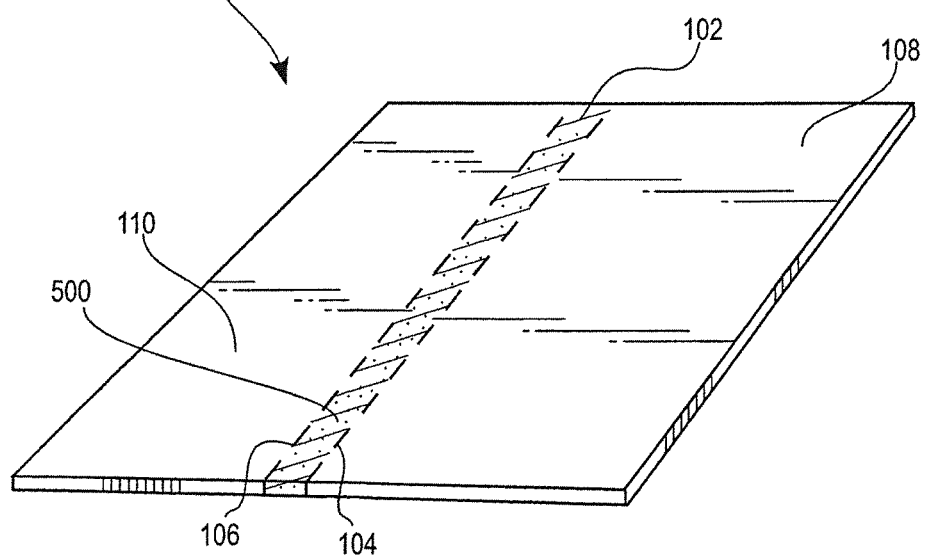
FIG. 5 is a perspective view of the composite material with the hinge formed by a chemical matrix blocking material or agent according to an embodiment of the present invention.

FIG. 5 depicts another embodiment of a method of removal of portions of the composite structure 100 to form the hinge 102. FIG. 5 shows the composite structure 100 in sheet-like shape, a chemical blocking material or agent 500, and the hinge 102. The chemical blocking material or agent 500 is placed so that the chemical blocking material or agent 500 covers the area bounded by the edges 104, 106 and that forms the hinge 102. As shown in FIG. 5, the chemical blocking material or agent 500 is placed on the composite structure 100 after placing the fiber reinforcement but prior to the addition of the composite matrix.

The hinge 102 is formed in FIG. 5 by preventing the composite matrix from entering the area of the hinge 102 bounded by the edges 104, 106. The chemical blocking material or agent 500 may be gypsum plaster or other suitable material, for example, any water-soluble polymer, or the like. The composite matrix of the composite structure 100 is added onto the fiber reinforcement of the composite structure 100 after placement of the chemical blocking material or agent 500. The chemical blocking material or agent 500 may be removed after the composite matrix has set. The hinge width for this method is approximately ¹⁄₁₆"-¼".

Figure 6:
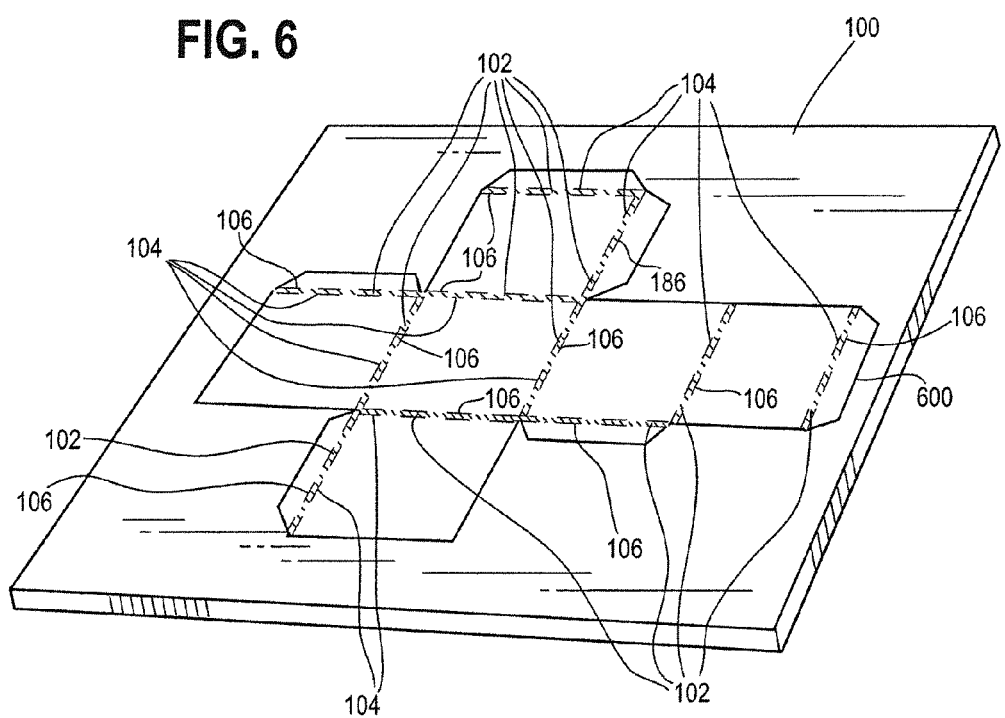
FIG. 6 is a perspective view of the composite material with a plurality of hinges and cut lines according to an embodiment of the present invention.

Referring next to FIG. 6, in one embodiment of the invention, a complex shape is formed by creating a plurality of hinges 102 in the composite structure 100. FIG. 6 shows the composite structure 100 in a sheet-like shape with the plurality of hinges 102, a plurality of edges 104, 106 and an exemplary cut line 600. In the embodiment illustrated in FIG. 6, the composite structure 100 is cut so that an irregular planar shape is formed. Those skilled in the art will note that the cuts may be made by any suitable method.

The hinges 102 in the composite structure 100 of FIG. 6 may be formed by laser matrix removal as shown in FIG. 2, torch matrix removal as shown in FIG. 3, matrix blocking bar removal as shown in FIG. 4, chemical blocking material or agent removal as shown in FIG. 5, or any other suitable method. The composite structure 100 having an irregular planar shape shown in FIG. 6 is an unfolded cube shape, with additional flaps at some edges to allow for overlapping at corners. The planar shape of the composite structure 100 shown in FIG. 6 may be folded along the hinges 102 to create a three-dimensional shape.

Figure 6A:
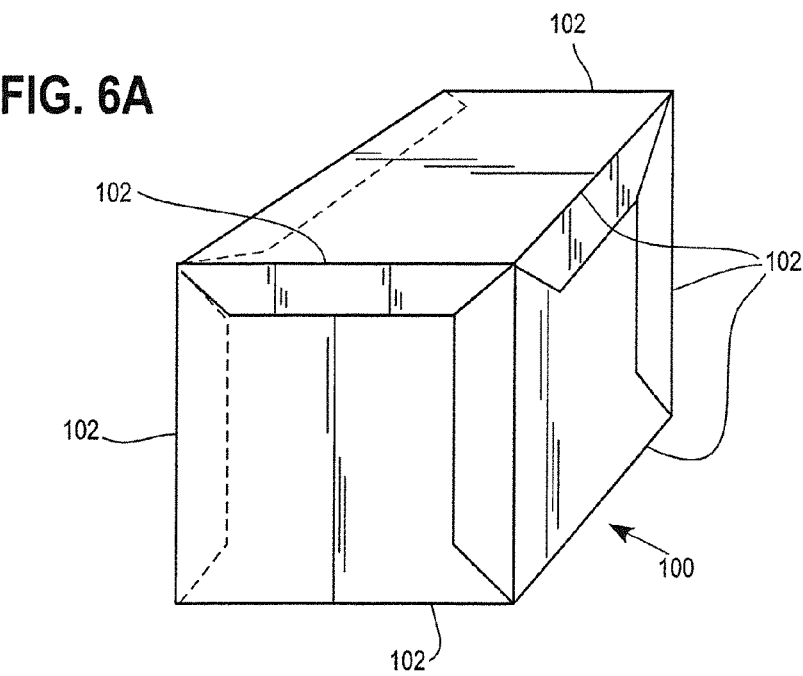
FIG. 6A is a perspective view of the composite material with a plurality of hinges and cut lines formed into a three-dimensional shape according to an embodiment of the present invention.

For example, the hinges 102 may be used to form 90° corners in the planar shape of the composite structure 100, forming a closed cube as shown in FIG. 6A. The planar composite structure 100 of FIG. 6 is advantageously formed into a three-dimensional closed shape shown in FIG. 6A without a mold or any additional support or substructure.

Open three-dimensional shapes or other planar foldable shapes may be formed similarly. After the exemplary cube shown in FIG. 6A is formed, additional composite matrix may be added to one or more of the hinges 102 shown in FIG. 6A, locking desired corners in place. Applications that utilize movable fiber hinges may include, for example, wallets, folding wheelchair ramps, and standard hinges.

Figure 7:
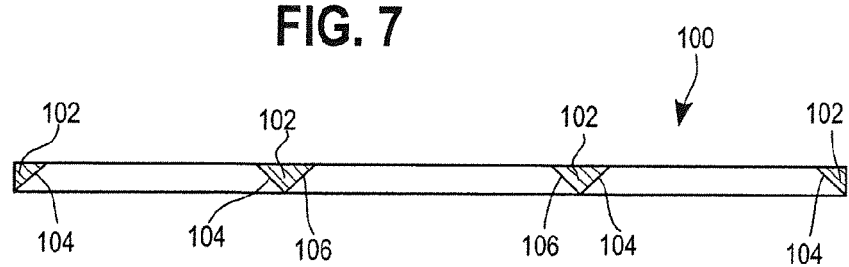
FIG. 7 is an end view of the composite material with a plurality of hinges according to an embodiment of the present invention.

Referring next to FIG. 7, a section of a composite structure 100 in a sheet-like shape with a plurality of hinges 102 and edges 104, 106 of the hinges 102 according to one embodiment is shown. As shown in FIG. 7, the hinges 102 vary in width across the thickness of the composite structure 100. The hinges 102 shown in FIG. 7 are triangular in cross-section, with the widest portion being at the top of the composite structure 100, and tapering linearly on each side to a point on the bottom of the composite structure 100.

When adjacent portions of the composite structure 100 are folded upward at a chosen triangular hinge 102 location, a corner is formed when the adjacent portions of composite structure 100 come into full contact with each other. This allows a degree of the corner angle to be determined by the formation of the hinge 102. In the example shown in FIG. 7, the triangular hinges 102 are parallel and evenly spaced across the width of the composite structure 100. The hinges 102 shown in FIG. 7 may be formed in the composite structure 100 by laser matrix removal as shown in FIG. 2, torch matrix removal as shown in FIG. 3, matrix blocking bar removal as shown in FIG. 4, chemical blocking material or agent removal as shown in FIG. 5, or other suitable method.

Figure 7A:
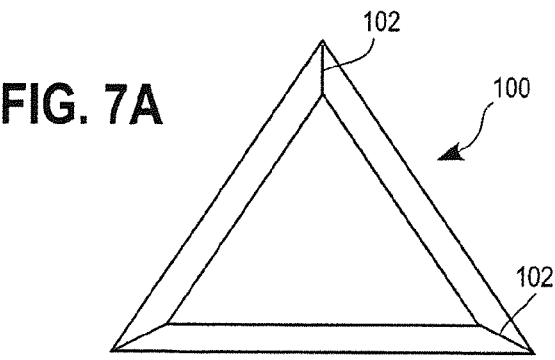
FIG. 7A is a side elevational view of the composite material with a plurality of hinges formed into a three-dimensional shape according to an embodiment of the present invention.

The composite structure 100 may be folded along the hinges 102 to create a 3-dimensional shape, for example, a triangular tube 700 as shown in FIG. 7A. In this example, the hinges 102 have been formed to result in 60° angles between the portions of composite structure 100, resulting in an equilateral triangle tube shape. The planar composite structure 100 is formed into the three-dimensional triangular tube 700 without a mold or any additional support or substructure. After the three-dimensional triangular tube 700 shown in FIG. 7A is formed, additional composite matrix may be added to the fiber hinge 102 areas, locking the three-dimensional shape in place. A tube shape thus formed may be used in varying applications, including, for example bicycle frames, wind turbine blades, and complex frame structures.

Figure 8:
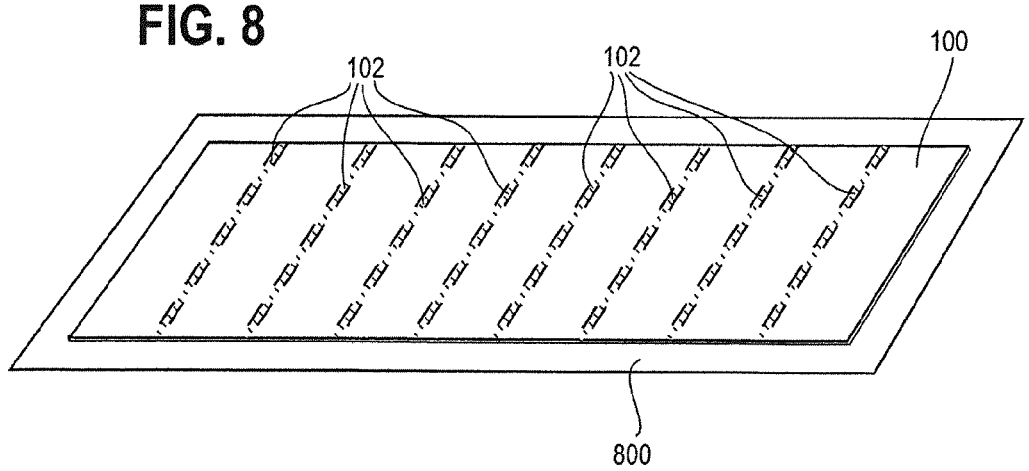
FIG. 8 is a perspective view of the composite material with a plurality of cut lines coupled to a fabric material according to an embodiment of the present invention.

Referring next to FIG. 8, a composite structure 100 in a sheet-like shape with a plurality of hinges 102 according to one embodiment is shown. In one exemplary approach, the composite structure 100 is coupled to a fabric material 800 by sewing the composite structure 100 and the fabric material 800 together along the hinges 102 as shown in FIG. 8. This creates an augmented fabric material with stiffness and strength additionally provided by the composite structure 100.

In one embodiment, the fabric material 800 may be attached to both sides of the composite structure 100, forming a material with a composite structure on the inside and fabric material on the outside. In another embodiment, additional pieces of the composite structure may be coupled to the augmented fabric material. In addition to providing locations to couple the composite structure 100 to the fabric material 800, the hinges 102 provide fold lines for the augmented fabric material. The augmented material may be cut, folded and/or attached in complex shapes. Examples of applications of the augmented fabric material include body armor, motorcycle protective gear, bags and purses.

Figure 9:
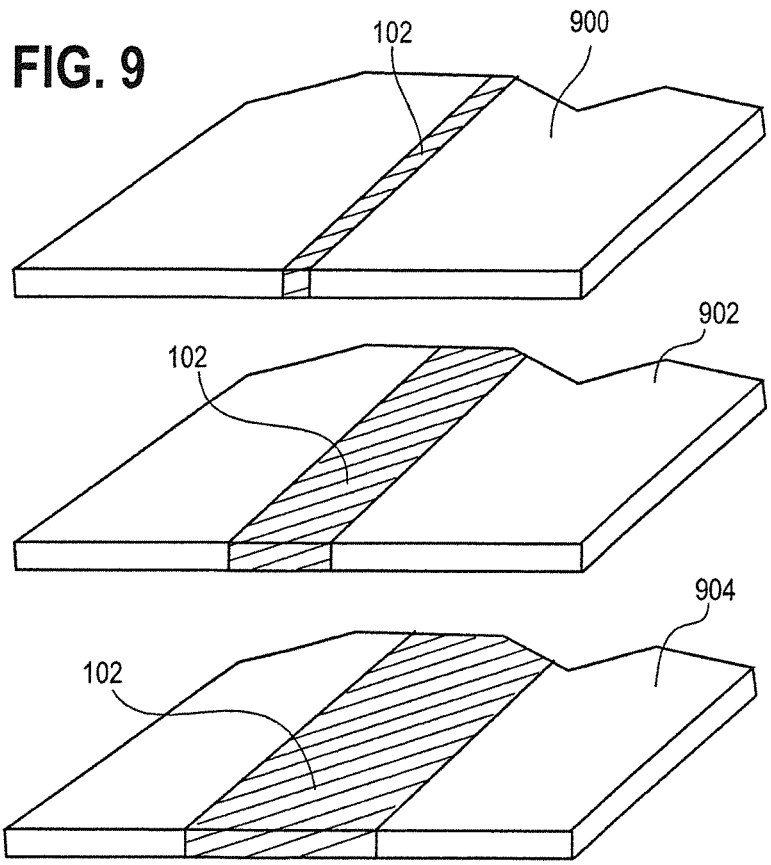
FIG. 9 is a perspective view of three composite material layers with hinges according to one embodiment of the present invention.

Referring next to FIG. 9, an alternative embodiment of the composite structure is shown including a top composite structure layer 900, a middle composite structure layer 902 and a bottom composite structure layer 904. Each composite structure layer 900, 902, 904 has a hinge 102, as shown in FIG. 9. The width of the hinges 102 of the composite structure layers 900, 902, 904 widens from top to bottom in FIG. 9; i.e., the hinge 102 of the top composite structure layer 900 is the thinnest, the hinge 102 of the middle composite structure layer is wider than the hinge 102 of the layer 900, and the hinge 102 of the bottom composite structure layer 904 is the widest of the three. The width of the hinge is increased by approximately two times the thickness of the composite structure layer for each successive layer.

Figure 9A:
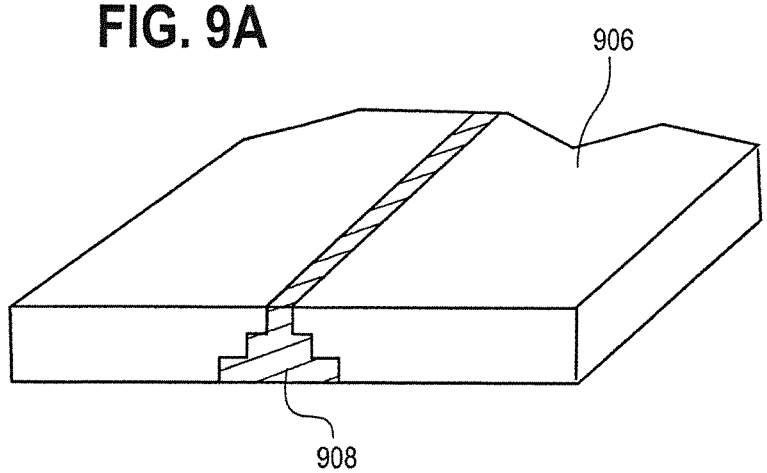
FIG. 9A is a perspective view of a thicker composite material with a thick hinge according to an embodiment of the present invention.

As shown in FIG. 9A, the composite structure layers 900, 902, 904 are layered and bonded together to create a composite structure 906 including a hinge 908, which is preferably formed by aligning the centerlines of the hinges 102 of the composite structure layers 900, 902, 904. The composite structure layers 900, 902, 904 are bonded together using epoxy, resin, or the like. Examples of applications of layered composite structures with hinges 908 include wheelchair ramps and airplane wing flaps, or any other structure that requires additional strength.

While the invention herein disclosed has been described by means of specific embodiments, examples and applications thereof, numerous modifications and variations could be made thereto by those skilled in the art without departing from the scope of the invention set forth in the claims.

What is claimed is:

1. A method for removing matrix from a composite material, comprising the steps of:
    orienting a laser with a beam axis of the laser approximately perpendicular to a first surface of the composite material, the composite material comprising reinforcement embedded in the matrix and also having a thickness bounded by the first surface and a second surface of the composite material; and
    traveling, over a region of the first surface of the composite material, of the laser beam, wherein the laser is configured to remove a portion of the thickness of the composite matrix at the region while leaving the reinforcement of the composite material intact, whereby the composite material is bendable at the removed portion.

2. The method for removing matrix from the composite material of claim 1, wherein the laser is a $CO_2$ laser.

3. The method for removing matrix from the composite material of claim 1, wherein a width of the region is no more than 10 mm.

4. The method for removing matrix from the composite material of claim 1, whereby a hinge is formed at the region.

5. The method for removing matrix from the composite material of claim 4, whereby the hinge allows the composite material to bend about the hinge by up to 180 degrees.

6. The method for removing matrix from the composite material of claim 1, wherein the region extends across a length of the composite material.

7. A method for removing matrix from a composite material, comprising the steps of:
    orienting a laser with a beam axis of the laser approximately perpendicular to a first surface of the composite material, the composite material comprising reinforcement embedded in the matrix and also having a thickness bounded by the first surface and a second surface of the composite material; and
    traveling, over a region of the first surface of the composite material, of the laser beam, wherein the laser is configured to remove all of the composite matrix at the region while leaving the reinforcement of the composite material intact, whereby the composite material is bendable at the removed portion.

8. The method for removing matrix from the composite material of claim 7, wherein the laser is a $CO_2$ laser.

9. The method for removing matrix from the composite material of claim 7, wherein a width of the region is no more than 10 mm.

10. The method for removing matrix from the composite material of claim 7, whereby a hinge is formed at the region.

11. The method for removing matrix from the composite material of claim 10, whereby the hinge allows the composite material to bend about the hinge by up to 180 degrees.

12. The method for removing matrix from the composite material of claim 7, wherein the region extends across a length of the composite material.

* * * * *